United States Patent [19]

Caldwell, Jr. et al.

[11] 4,223,735

[45] Sep. 23, 1980

[54] PETROLEUM PRODUCTION TECHNIQUE UTILIZING A HOT AQUEOUS FLUID

[75] Inventors: Paul L. Caldwell, Jr., Aurora, Colo.; Earl S. Snavely, Jr., Arlington, Tex.

[73] Assignee: Mobil Oil Corporation, New York, N.Y.

[21] Appl. No.: 955,550

[22] Filed: Oct. 27, 1978

[51] Int. Cl.² .................. E21B 43/24; C01B 17/62; C01F 11/48

[52] U.S. Cl. .................................. 166/303; 166/272; 423/242

[58] Field of Search .............. 166/266, 267, 272, 303, 166/75 R; 55/23, 73; 423/242

[56] References Cited

U.S. PATENT DOCUMENTS

| | | | |
|---|---|---|---|
| 1,271,899 | 7/1918 | Howard et al. | 423/242 |
| 3,618,667 | 11/1971 | Snavely, Jr. | 166/310 |
| 3,834,129 | 9/1974 | Darlinger et al. | 423/242 X |
| 3,844,349 | 10/1974 | Snavely, Jr. et al. | 166/272 |
| 3,880,237 | 4/1975 | Snavely, Jr. et al. | 166/303 |
| 3,883,639 | 5/1975 | Cronkright, Jr. et al. | 423/242 |
| 3,918,521 | 11/1975 | Snavely, Jr. et al. | 166/272 |
| 3,950,493 | 4/1976 | Dörr et al. | 423/242 |
| 3,969,482 | 7/1976 | Teller | 55/73 X |
| 4,029,751 | 6/1977 | Dörr et al. | 55/73 X |

*Primary Examiner*—Stephen J. Novosad
*Assistant Examiner*—George A. Suchfield
*Attorney, Agent, or Firm*—Charles A. Huggett; Michael G. Gilman; Charles J. Speciale

[57] ABSTRACT

This specification discloses a method of producing petroleum from a petroleum-bearing formation. A hot aqueous fluid is generated in a hot aqueous fluid generator that is fired with a sulfur-containing fuel and the hot aqueous fluid is injected into the petroleum-bearing formation and petroleum is produced therefrom. The firing of the hot aqueous fluid generator with the sulfur-containing fuel produces a flue gas which contains sulfur oxides. The flue gas is treated with alkaline water in a system comprised of a venturi scrubber vessel and a trayed emission scrubber vessel to scrub the sulfur oxides from the flue gas and the scrubber flue gas is discharged from the trayed emission scrubbers.

9 Claims, 3 Drawing Figures

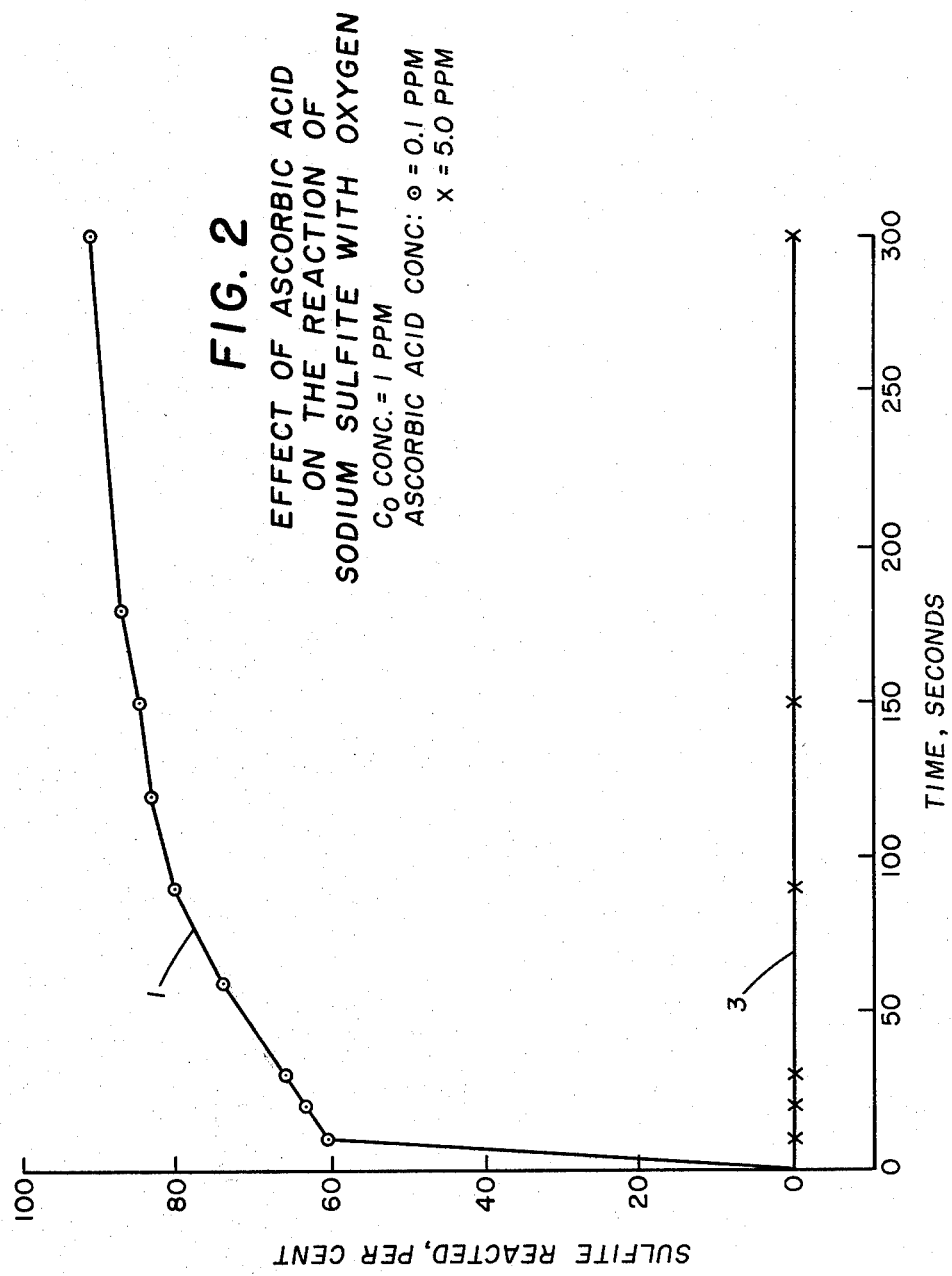

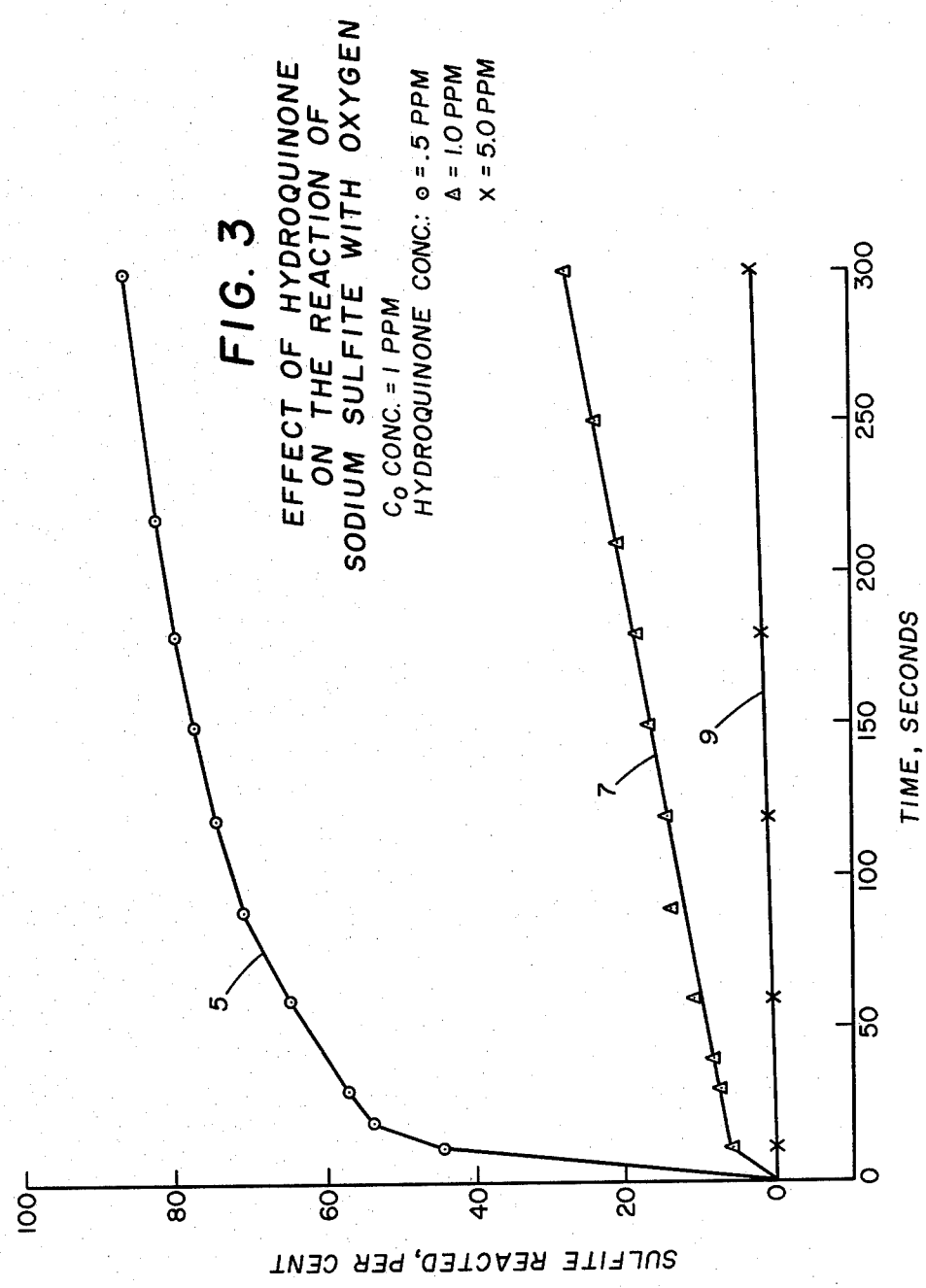

PETROLEUM PRODUCTION TECHNIQUE UTILIZING A HOT AQUEOUS FLUID

BACKGROUND OF THE INVENTION

This invention is directed to a method of producing petroleum from a petroleum-bearing formation wherein there is injected into the formation a hot aqueous fluid that is generated by firing a hot aqueous fluid generator with a sulfur-containing fuel and which generator emits a flue gas that contains sulfur oxides.

In the production of a hot aqueous fluid for use in a thermal oil recovery process, water is injected into a hot aqueous fluid generator as feed water and the generator is fired with a fuel such as gas or oil to heat the water and normally vaporize at least a portion thereof and form steam. The heated aqueous fluid is then injected via an injection well into a producing formation and oil or petroleum is produced therefrom. In the burning of the fuel, a flue gas is produced which flue gas has sometimes been treated but oftentimes has been vented directly to the atmosphere. In the burning of a sulfur-containing fuel, the flue gas contains sulfur oxides which desirably should not be vented to the atmosphere.

In an article published in CHEMICAL WEEK, Sept. 2, 1970, entitled "Smokestack Oxides May Get Sea Water Scrubbing," there is described a process that uses seawater to scrub sulfur oxides from power plant smokestack gases. In U.S. Pat. No. 1,271,899 to Henry Howard et al, there is described a process wherein furnace gases are brought into contact in a scrubbing tower with a dilute solution of alkali which effectively removes the greater part of the sulfur dioxide and yields a harmless exit gas and a dilute solution of sodium sulfite. The sodium sulfite is causticized by lime to form insoluble calcium sulfite which is recovered. Thus, the sulfur dioxide is recovered as calcium sulfite.

In U.S. Pat. No. 3,844,349 to Earl S. Snavely, Jr. and Theodore A. Bertness, there is described a steam stimulation method of producing petroleum wherein steam is generated by firing a steam generator with a sulfur-containing fuel and wherein the resulting flue gas that contains sulfur oxides is treated to remove the sulfur oxides therefrom prior to venting the flue gas to the atmosphere. The flue gas is treated in an emission scrubber vessel with an alkaline water which reduces alkalinity of the water, making it more readily usable as feed water for the steam generator.

In U.S. Pat. No. 3,880,237 to Earl S. Snavely, Jr. and Theodore A. Bertness, there is described a method of producing petroleum from a petroleum-bearing formation wherein a water, having bicarbonate ions, is treated with sulfur dioxide to reduce the bicarbonate ion concentration, thereby greatly reducing the formation of scale upon the addition of caustic to the water. Thereafter, a caustic is added to the treated water and the caustic water is injected into a petroleum-bearing formation and petroleum is produced therefrom. In U.S. Pat. No. 3,918,521 to Earl S. Snavely, Jr. and Theodore A. Bertness, a continuation-in-part application of the before-mentioned U.S. Pat. No. 3,844,349, an oxidation inhibitor is added to the alkaline water passed through he emission scrubber vessel to inhibit the oxidation of calcium sulfite formed in the emission scrubber vessel to calcium sulfate.

In U.S. Pat. No. 3,618,667, there is described a technique for treating water that contains hydrogen sulfide and oxygen dissolved therein to retard the corrosion of metal contacted with the water. A transition metal is added to the water to catalyze the reaction of the hydrogen sulfide and oxygen and thereby remove the oxygen from the water.

SUMMARY OF THE INVENTION

This invention is directed to a method of producing petroleum from a petroleum-bearing formation penetrated by a well means wherein a hot aqueous fluid is generated in a hot aqueous fluid generator that is fired with a fuel that contains sulfur and a flue gas is emitted that contains sulfur oxides. The hot aqueous fluid is injected into the petroleum-bearing formation and petroleum is produced therefrom. The flue gas is scrubbed with alkaline water to remove sulfur oxides therefrom in a system comprised of a venturi scrubber vessel and an emission scrubber vessel.

BRIEF DESCRIPTION OF THE DRAWINGS

FIG. 2. is a graph showing the effect of ascorbic acid on the reaction of sodium sulfite with oxygen.

FIG. 3 is a graph showing the effect of hydroquinone on the reaction of sodium sulfite with oxygen.

DESCRIPTION OF THE PREFERRED EMBODIMENTS

Figure 1:
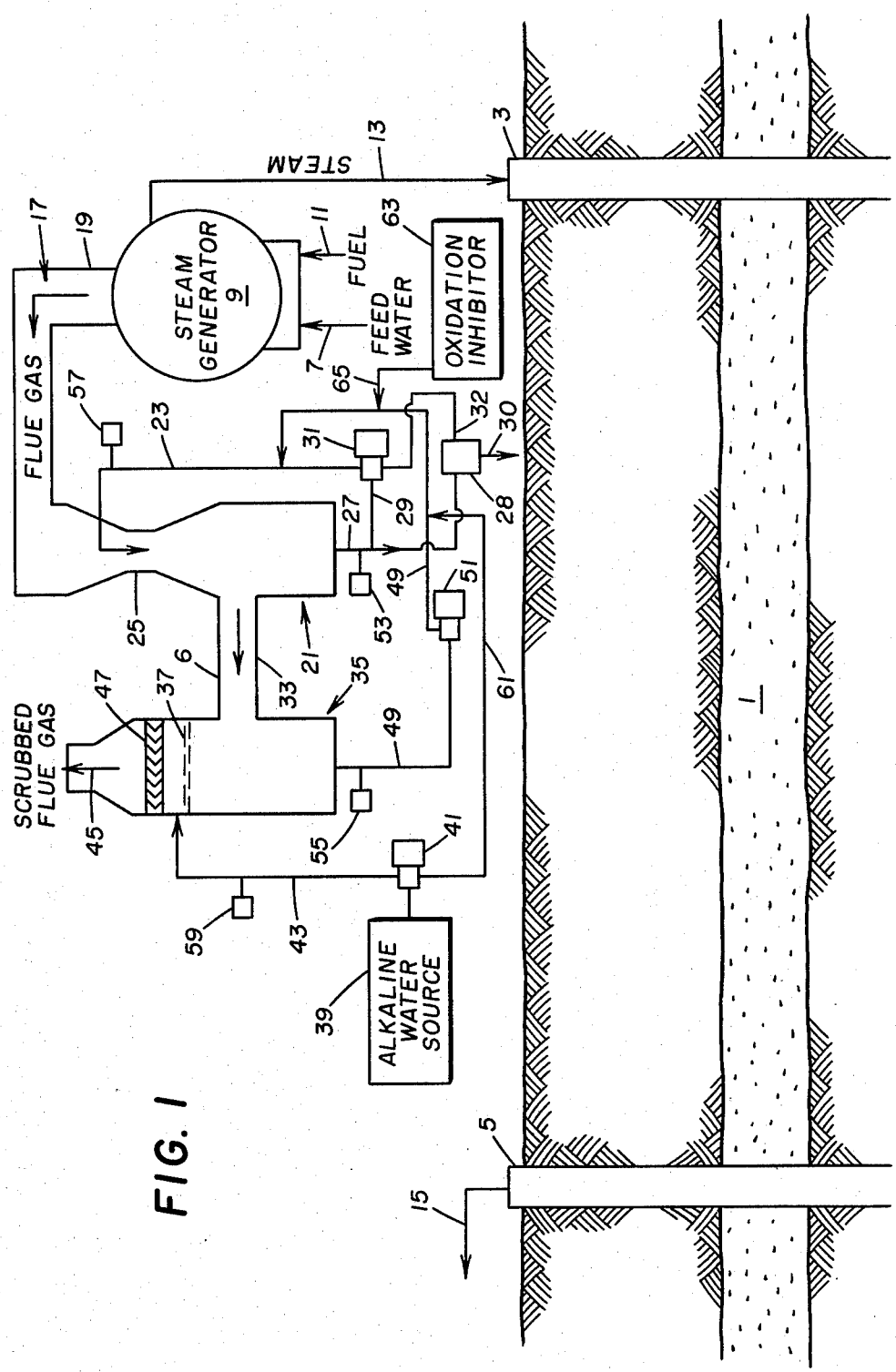
FIG. 1 is a schematic flow diagram illustrating a scrubber system as used in accordance with the invention.

This invention is directed to a method of producing petroleum from a petroleum-bearing formation by injecting into the formation a hot aqueous fluid that is generated by a hot aqueous fluid generator fired with a sulfur-containing fuel. The hot aqueous fluid generator emits a flue gas that contains sulfur oxides and the flue gas is scrubbed with an alkaline water to remove the sulfur oxides therefrom. The hot aqueous fluid most used in accordance with this invention is steam and the hot aqueous fluid generator most used is a steam generator. Hereafter for simplicity of description, this invention will be described with reference to the use of steam generated by a steam generator but it is to be understood that other hot aqueous fluids could be used.

A copending application U.S. Ser. No. 955,548 "Water Treatment Method to Remove Dissolved Oxygen" by Paul L. Caldwell, Jr. and Earl S. Snavely, Jr., filed on even date herewith describes a method of forming an additive comprised of sodium sulfite and ascorbic acid for use as an oxygen scavenger.

The present invention is closely related to the invention as described in the aforementioned U.S. Pat. No. 3,844,349 to Earl S. Snavely, Jr. and Theodore A. Bertness. In the present invention as in the Snavely and Bertness patent, steam is generated by a steam generator fired with a sulfur-containing fuel and the steam is injected via an injection well into a petroleum-bearing formation and petroleum is produced therefrom via a production well. The injection and production wells are referred to generally as "well means" though the well means could take the form of a single well or a plurality of wells. The flue gas containing sulfur oxides is scrubbed using alkaline water to remove the sulfur oxides therefrom. The system of the present invention for scrubbing the flue gases provides for more efficient use of the alkali and provides a practical method for more completely removing the sulfur oxides from the flue gas. The alkaline water after use in scrubbing the flue gases may be used for such things as feed water or makeup feed water for the steam generator.

For a more detailed description of the invention, reference is made to the drawings. With reference first to FIG. 1, there is shown a petroleum-bearing formation 1 that is penetrated by a well means, illustrated as an injection well 3 and a production well 5. Water from a water source not shown is delivered via a conduit 7 to a steam generator 9 as generator feed water. A sulfur-containing fuel is delivered via a conduit 11 into the steam generator and there fired to convert the feed water into steam. The steam is delivered from the steam generator 9 via a conduit 13 and injected via the injection well 3 into the petroleum-bearing formation 1 to assist in driving the petroleum to the production well 5 where it is produced to the surface of the earth and delivered via a conduit 15 to appropriate storage facilities (not shown). The burning of the sulfur-containing fuel in the steam generator 9 produces a flue gas 17 which contains sulfur oxides including, in particular, sulfur dioxide ($SO_2$). The flue gas 17 is flowed through a conduit 19 and into a venturi scrubber vessel 21. An alkaline water is flowed via a conduit 23 and is mixed with the flue gas 17 ahead of a venturi 25 of the venturi scrubber vessel 21 and flowed through the venturi scrubber vessel to remove sulfur oxides from the flue gas and thereby reducing the alkalinity of the alkaline water. The venturi scrubber vessel 21 is equipped with a conduit 27 and valve means (not shown) for discharging the water of reduced alkalinity therefrom. A conduit 29 connects with the conduit 27 and with a pump 31 such that at least a portion of the water of reduced alkalinity may be circulated from the lower portion of the venturi scrubber vessel below the venturi back into the upper portion thereof above the venturi and there mixed ahead of the venturi 25 with additional alkaline water and with the flue gas entering the venturi scrubber vessel for further use in scrubbing the flue gas. The flue gas 17 with possibly some entrained alkaline water is discharged from the venturi scrubber vessel 21 via a conduit 33 and injected into a trayed scrubber vessel 35 at a point below a contact tray or trays 37 positioned therein. Fresh alkaline water is an amount to make up for the discharged alkaline water from the venturi scrubber vessel 21 via conduits 27 and 30 and having sufficient alkalinity to maintain the desired pH levels throughout the scrubber system is delivered from an alkaline water source 39 via a pump 41 and conduit 43 and is injected into the trayed emission scrubber vessel 35 above the contact tray 37 therein. The flue gas which flows into the trayed emission scrubber vessel 35 via the conduit 33 flows upward through the tray 37 and contacts in counterflow the alkaline water where the sulfur oxides of the flue gas react with the alkaline water and scrub or remove the sulfur oxides therefrom. The scrubbed flue gas 45 is discharged from the trayed emission scrubber vessel 35 and may be discharged to the atmosphere. A mist eliminator 47 may be provided within the trayed emission scrubber vessel 35 to mitigate the discharge of alkaline water along with the flue gas 45 to the atmosphere. A conduit 49 is provided to communicate with the lower portion of the trayed emission vessel 35 along with appropriate valve means (not shown) for removing alkaline water therefrom. The conduit 49 connects with a pump 51 and provides a means for circulating alkaline water from the lower portion of the trayed emission scrubber vessel 35 into the conduit 23 and thus into the venturi scrubber vessel 21 for further use in removing sulfur oxides from the flue gas 17. There may be provided pH meters for monitoring the pH of the alkaline water at various points within the system. For example, a pH meter 53 may be provided to monitor the pH of the alkaline water exiting from the venturi scrubber vessel 21. A pH meter 55 may be provided to monitor the pH of alkaline water that flows from the emission scrubber vessel 35 into the conduit 49 and a pH meter 57 may be provided to monitor the pH of the alkaline water that is flowed into the venturi scrubber vessel 21. Another pH meter 59 may be provided to monitor the pH of the alkaline water flowing via the conduit 43 into the trayed emission scrubber vessel 35.

In carrying out the method of this invention, the steam generator 9 is fired with a sulfur-containing fuel and emits a flue gas containing sulfur oxides which flue gas is conducted via conduit 19 into the venturi scrubber vessel 21 where a first portion and a large percentage, normally on the order of 50 to 80 weight percent, of the sulfur oxides are scrubbed from the flue gas. The flue gases are exhausted from the venturi scrubber vessel 21 via conduit 33 into the trayed scrubber vessel 35 where a second portion of the sulfur oxides are scrubbed from the flue gases. The flue gases are then vented to the atmosphere. In the operation of the steam generator, feed water is injected thereinto and steam is produced, which steam is flowed via conduit 13 to injection well 3 and injected therein and into petroleum-bearing formation 1 to drive petroleum therefrom for recovery via production well 5. The recovered petroleum is flowed via conduit 15 to storage (not shown).

This invention provides for efficiently using the alkali in an alkaline water that is used for scrubbing sulfur oxides from a flue gas and allows the removal of up to 99 percent of the sulfur oxides present therein. In the scrubbing of the flue gases in accordance with this invention, alkaline water having a pH greater than 7 and desirably up to 13 or 14 to provide ample alkali for scrubbing the flue gas is flowed from an alkaline water source 39 via a pump 41 and conduit 43 into the trayed emission scrubber vessel 35 above the trays 37 therein. The alkaline water introduced into the trayed emission scrubber vessel 35 is flowed counterflow to the flue gas that is introduced thereinto via the conduit 33 to scrub the sulfur oxides therefrom, reduce the alkalinity of the alkaline water, and form sulfites. This alkaline water is flowed through the emission scrubber vessel at a rate such that after scrubbing the flue gases therein the alkaline water of reduced alkalinity that exits from the emission scrubber vessel 35 via conduit 49 has a pH of at least 6½. The alkaline water exiting from the trayed emission scrubber vessel 35 flows via a conduit 49, pump 51, and conduit 23 into the venturi scrubber vessel 21 where it reacts with the flue gas 17 to scrub the sulfur oxides therefrom, further reduces the alkalinity of the water of reduced alkalinity and forms sulfites. The water of reduced alkalinity that flows into the venturi scrubber vessel 21 is further reduced such that the alkaline water which exits therefrom via conduit 27 has a pH within the range of about 5 to 6. The control of pH drop through the venturi scrubber vessel is provided by controlling the flow rate of the alkaline water therethrough. Valves (not shown) may be provided in the conduits 23 and 27 to control the flow rate of the alkaline water through the venturi scrubber vessel.

In accordance with an embodiment, at least a portion of the alkaline water of further reduced alkalinity that exits from the venturi scrubber vessel via contuit 27 is flowed via conduit 29, pump 31, and conduit 23 and is mixed with the alkaline water of reduced alkalinity that is flowed from the emission scrubber vessel 35 to the venturi scrubber vessel 21 and is recirculated through the venturi scrubber vessel 21 to further utilize the alkalinity remaining therein and form sulfites. The alkaline water of further reduced alkalinity exiting from the venturi scrubber vessel 21 may be flowed via conduit 27 to a means 28 for separating sulfites therefrom. The separated sulfites are discharged therefrom via conduit 30 while the alkaline water of further reduced alkalinity is discharged therefrom via conduit 32 and may be recirculated through the venturi scrubber vessel 21 as shown or discarded as desired.

In accordance with another embodiment of this invention, fresh alkaline water from alkaline water source 39 may be injected via conduits 61, 49, and 23 into the venturi scrubber vessel 21. This embodiment may be used primarily during the initial start-up of the scrubbing operation.

As described in the aforementioned U.S. Pat. No. 3,844,349, the term "alkaline water" is meant a water which has basic properties, that is, that will neutralize an acid by reaction of the basic components of the water with the acid to form salts. In water analysis, alkalinity represents the carbonates, bicarbonates, hydroxides, and occasionally the borates, silicates, and phosphates in the water. The alkaline water of the alkaline water source 39 should contain sufficient alkalinity to react with all of the sulfur oxides contained in the flue gas as the alkaline water and flue gas pass in counterflow, one with the other, through the emission scrubber vessel and mix with one another in the venturi scrubber vessel. The optimum alkalinity of the water depends among other things, upon the amount of sulfur oxides in the flue gas, the flow rates of the flue gas and alkaline water through the emission scrubber vessel and the venturi scrubber vessel and the efficiency of the scrubbing system. As previously mentioned, the alkaline water of the alkaline water source 39 should have a pH greater than 7.0 and desirably up to about 13 or 14.

The reactions that take place in scrubbng sulfur dioxide from flue gas by contacting the flue gas with an aqueous alkaline solution of soluble bicarbonates was illustrated in U.S. Pat. No. 3,844,349 as follows:

$$CO_3^- + CO_2 + H_2O \rightleftharpoons 2HCO_3^- \tag{1}$$

$$SO_2 + 2HCO_3^- \rightarrow SO_3^= + 2CO_2 + H_2O \tag{2}$$

$$SO_3^= + \tfrac{1}{2}O_2 \rightarrow SO_4^= \tag{3}$$

Insoluble carbonates, such as calcium carbonate ($CaCO_3$), may be dissolved by contact with carbonated water as follows:

$$CaCO_3 + CO_2 + H_2O \rightarrow Ca^{++} + 2HCO_3^- \tag{4}$$

The solution of equation (4) may then be used to scrub $SO_2$ as given in equations (2) and (3).

The source of alkali for the alkaline water may also be provided by adding sodium hydroxide (NaOH) to a water. This solution of NaOH may then be reacted with $SO_2$ to remove the sulfur dioxides from flue gas as indicated below.

$$SO_2 + NaOH \rightarrow NaHSO_3 \tag{5}$$

In accordance with still another embodiment of this invention, an oxidation inhibitor may be mixed with the alkaline water used for scrubbing the flue gas. The oxidation inhibitor may be added to the alkaline water as shown in FIG. 1 by flowing from an oxidation inhibitor source 63 via conduit 65 and conduits 49 and 23 into the venturi scrubber vessel 21. The oxidation inhibitor may also be added and preferably will be added to the alkaline water that is flowed via conduit 43 into the trayed emission scrubber vessel 35 to mitigate the oxidation of sulfites to sulfates within the trayed emission scrubber vessel 35 and the venturi scrubber vessel 21 as well. The oxidation inhibitor should be added in an amount sufficient to substantially inhibit the oxidation of sulfites to sulfates. Normally, an oxidation inhibitor concentration within the range of about 1 to 5 ppm will suffice. Suitable oxidation inhibitors which may be employed include ascorbic acid, formaldehyde, benzyl alcohol, phenol and hydroquinone with the exception that, in an embodiment to be later described wherein sodium hydroxide is used, only ascorbic acid may be employed.

The use of oxidation inhibitors in a similar process is described in U.S. Pat. No. 3,918,521 to Snavely, Jr. and Bertness. As there described, the calcium ions present in the alkaline water combine with the sulfite ions to form calcium sulfite ($CaSO_3$) which in turn is oxidized to calcium sulfate ($CaSO_4$). The calcium sulfite forms as an insoluble precipitant whereas the calcium sulfate is soluble. There it was desired to remove the calcium ions therefrom to avoid scaling problems, particularly when this water was to be used as feed water for the steam generator. An oxidation inhibitor was provided in the emission scrubber vessel to inhibit the oxidation of the sulfite ions to sulfate ions. The calcium sulfite being relatively insoluble could be removed from the water by mechanical means, such as by settling, filtering, or centrifuging. Suitable oxidation inhibitors which could be employed were identified as ascorbic acid, formaldehyde, benzyl alcohol, phenol, and hydroquinone. The oxidation inhibitors were used in sufficient concentrations to greatly reduce the reaction rate of the sulfite ion with oxygen. The actual amount of oxidation inhibitor to be added to inhibit the oxidation of calcium sulfite to calcium sulfate would depend upon such things as the amount of calcium sulfite and oxygen that is present and the temperatures involved. Normally, however, sufficient oxidation inhibitor was mixed with the alkaline water to provide a concentration of at least one part per million of alkaline water and normally no substantial increased benefits were found to be obtained by providing an oxidation inhibitor concentration of greater than 5 parts per million.

In accordance with another embodiment of this invention, an aqueous solution of sodium hydroxide (NaOH) is used as the alkaline water to scrub the sulfur oxides from the flue gas. Ascorbic acid is added as an oxidation inhibitor to the NaOh solution in an amount sufficient to inhibit the oxidation of the sodium sulfite, formed by the reaction of the sodium hydroxide with sulfur dioxide, to sodium sulfate. Normally, a concentration of 1 to 5 parts per million (ppm) of ascorbic acid in the aqueous NaOH solution is sufficient to inhibit this oxidation. The sodium sulfite may be recirculated through the venturi scrubber vessel without materially affecting the scrubbing action while allowing the sulfite concentration in the scrubbing solution to increase to a desired concentration before removal from the scrubber system. This desired concentration of sulfite in the scrubbing solution may be on the order of about 10 to 20 percent by weight of the alkaline scrubbing solution. The sodium sulfite solution is then discharged from the venturi scrubber vessel 21 and recovered for further use. The sulfite solution may be used as an oxygen scavenger additive for treating water to remove oxygen therefrom and render the treated water less corrosive. In the present operation, the sodium sulfite solution may be added to the feed water being injected into the stream generator to render the feed water less corrosive. The sulfite solution may also be added to water being injected via an injection well into a petroleum producing formation in the carrying out of a recovery process such as a waterflood to render the injected water less corrosive.

In scrubbing the flue gas containing sulfur dioxide with sodium hydroxide, the sulfur dioxide reacts with sodium hydroxide of relatively low pH and forms sodium bisulfite as indicated by equation (5) above or with sodium hydroxide of relatively high pH and form sodium sulfite as indicated by equation (6) below:

$$SO_2 + 2NaOH \rightarrow Na_2SO_3 + H_2O \quad (6)$$

The sodium bisulfite or sodium sulfite will in the absence of an oxidation inhibitor react with excess oxygen in the flue gas to form sodium bisulfate or sodium sulfate as indicated by the equations (7) and (8) below:

$$NaHSO_3 + \tfrac{1}{2}O_2 \rightarrow NaHSO_4 \quad (7)$$

$$Na_2SO_3 + \tfrac{1}{2}O_2 \rightarrow Na_2SO_4 \quad (8)$$

The addition of ascorbic acid in a sufficient amount prevents the oxidation of sodium sulfites, including sodium sulfite and sodium bisulfites, to sodium sulfates. A concentration of ascorbic acid within the range of about 1 to 5 ppm in the sodium hydroxide solution is sufficient for this purpose. In this regard, reference is made to FIG. 2 where there is shown a plot of sulfite reacted in weight percent of the sulfite present versus time for a reaction of sodium sulfite in an aqueous sodium sulfite solution with oxygen. This aqueous sodium sulfite solution contains 50 ppm of sodium sulfite. Oxygen was bubbled through the aqueous sodium sulfite solution at a temperature of 72° F. Cobalt (Co) in a concentration of 1 ppm was added to the sodium sulfite solution as a catalyst to catalyze the reaction of the oxygen with the sulfite. Curve 1 shows that 90 percent of the sulfite reacts and forms sulfate in about 4 minutes in the presence of 0.1 ppm of ascorbic acid under the test conditions. Curve 3 shows that with an ascorbic acid concentration of 5.0 ppm none of the sulfite reacts. It is to be noted that cobalt, a catalyst for the reaction of sulfite with oxygen, in the amount of 1 ppm is present in this test. This test is more severe than would be the case in the absence of cobalt.

Tests indicated that ascorbic acid is a preferred oxidation inhibitor to use in accordance with this invention inasmuch as no sulfite reacted with oxygen in the presence of 5 ppm of ascorbic acid. Comparison of the effects of ascorbic acid versus hydroquinone is seen by comparing the plots of FIG. 2 and FIG. 3. FIG. 3 is a plot of data taken under the same conditions as that of FIG. 2 with the exception that hydroquinone was added as an oxidation inhibitor rather than ascorbic acid. In FIG. 3, curve 5 shows the amount of sulfite reacted versus time wherein hydroquinone is added as an oxidation inhibitor in the amount of 0.5 ppm; curve 7 shows the results with a hydroquinone concentration of 1.0 ppm; and curve 9 shows the results with a hydroquinone concentration of 5.0 ppm. The data of FIG. 3 shows that some of the sulfite continues to react with oxygen with a hydroquinone concentration of 5.0 ppm in the presence of a cobalt catalyst.

In accordance with still another embodiment of this invention, ascorbic acid is added and maintained in the aqueous sodium hydroxide solution in an amount sufficient to inhibit the oxidation of sodium sulfite to sodium sulfate. Normally, no more than 5 ppm of ascorbic acid is sufficient for this purpose. The process is controlled to provide for the aqueous sodium hydroxide solution exiting from the emission scrubber vessel 35 to have a pH within the range of about $6\tfrac{1}{2}$ to $7\tfrac{1}{2}$ and the aqueous hydroxide solution exiting from the venturi scrubber to have a pH within the range of about 5 to 6. In this way the venturi scrubber vessel 21 is operated at a low pH, a pH no greater than about $7\tfrac{1}{2}$, which results in the conversion of sulfur oxides primarily into sodium bisulfite and provides for the most efficient use of the sodium hydroxide. A portion of the aqueous sodium hydroxide solution is recycled from the lower portion of the venturi scrubber vessel via conduits 27 and 29, pump 31, and conduit 23 through the venturi scrubber vessel until the sulfite concentration in the venturi scrubber vessel reaches about 10 to 20 weight percent after which the sulfite solution is recovered. Thereafter, the sulfite solution, comprising primarily sodium bisulfite, may be added as an oxygen scavenger to a water, such as the feed water or injection water, to reduce the corrosiveness thereof. The sulfite solution is injected into a water containing oxygen such that the ascorbic acid is sufficiently diluted to reduce the effectiveness thereof to the point that the diluted sulfite solution may be used as an oxygen scavenger. The sulfite solution containing ascorbic acid is normally injected into the water such that it is diluted within the range of 100 fold to 1000 fold. As a minimum, the sulfite solution is diluted when added as an oxygen scavenger to water sufficiently to dilute the ascorbic to provide an ascorbic acid concentration of no more than 0.1 ppm such that the ascorbic acid may be tolerated in the sulfite solution when used as an oxygen scavenger. The diluted sulfite solution containing ascorbic acid in an amount no greater than 0.1 ppm is reactive in water containing dissolved oxygen to remove the oxygen therefrom.

What is claimed is:

1. A method of producing petroleum from a petroleum-bearing formation penetrated by a well means comprising:
   (a) generating a hot aqueous fluid by injecting feed water into a hot aqueous fluid generator and firing said hot aqueous fluid generator with a sulfur-containing fuel, said hot aqueous fluid generator emitting a flue gas containing sulfur oxides;
   (b) injecting said hot aqueous fluid via said well means into said petroleum-bearing formation;
   (c) producing petroleum via said well means from said petroleum-bearing formation;
   (d) flowing said flue gas containing sulfur oxides through a venturi scrubber vessel and thereafter through an emission scrubber vessel;

(e) flowing alkaline water having a pH of at least 7 into said emission scrubber vessel and therethrough in counterflow with said flue gas to remove sulfur oxides therefrom and form sulfites;

(f) discharging from said emission scrubber vessel alkaline water having a pH greater than 6 and flowing said alkaline water of a pH greater than 6 into said venturi scrubber vessel above a venturi therein and therethrough with said flue gas to remove sulfur oxides therefrom and form sulfites;

(g) discharging alkaline water having a pH within the range of about 5 to 6 from said venturi scrubber vessel below said venturi; and (h) discharging said flue gas having sulfur oxides removed therefrom from said emission scrubber vessel.

2. The method of claim 1 wherein said alkaline water discharged from said emission scrubber vessel has a pH within the range of about 6.5 to 7.5.

3. The method of claim 1 wherein a portion of said discharged alkaline water of step (g) is mixed with said alkaline water of step (f) and recirculated through said emission scrubber vessel for further use in treating said flue gas to remove sulfur oxides therefrom and form sulfites.

4. The method of claim 3 wherein an oxidation inhibitor is added to said alkaline water in an amount to inhibit the oxidation of said sulfites to sulfates.

5. The method of claim 4 wherein said alkaline water is an aqueous sodium hydroxide solution.

6. The method of claim 5 wherein said oxidation inhibitor is ascorbic acid.

7. A method of producing petroleum from a petroleum-bearing formation penetrated by a well means comprising:

(a) generating a hot aqueous fluid by injecting feed water into a hot aqeuous fluid generator and firing said hot aqueous fluid generator with a sulfur-containing fuel, said hot aqueous fluid generator emitting a flue gas containing sulfur oxides;

(b) injecting said hot aqueous fluid via said well means into said petroleum-bearing formation;

(c) producing petroleum via said well means from said petroleum-bearing formation;

(d) flowing said flue gas containing sulfur oxides through a venturi scrubber vessel and thereafter through an emission scrubber vessel;

(e) flowing an aqueous sodium hydroxide solution having a pH of at least 7 into said emission scrubber vessel and therethrough in counterflow with said flue gas to remove sulfur oxides therefrom and form sulfites;

(f) discharging from said emission scrubber vessel an aqueous sodium hydroxide solution having a pH greater than 6 and flowing said discharged aqueous sodium hydroxide solution into said venturi scrubber vessel above a venturi therein and therethrough in with said flue gas to remove sulfur oxides therefrom and form sulfites;

(g) injecting ascorbic acid into said aqueous sodium hydroxide solution in an amount sufficient to inhibit the oxidation of said sulfites to sulfates;

(h) discharging an aqueous sodium hydroxide solution having a pH within the range of about 5 to 6 from said venturi scrubber vessel below said venturi;

(i) recirculating a portion of said sodium hydroxide solution having a pH of about 5 to 6 through said venturi scrubber vessel and mixing said solution with said discharged sodium hydroxide solution from said emission scrubber vessel to further treat said flue gas and remove sulfur oxides therefrom and form sulfites;

(j) continue the recirculation until said sulfites reach a desired concentration;

(k) recovering said sulfites from said venturi scrubber vessel; and (l) discharging said flue gas having sulfur oxides removed therefrom from said emission scrubber vessel.

8. A method of producing petroleum from a petroleum bearing formation penetrated by a well means comprising:

(a) generating a hot aqueous fluid by injecting feed water into a hot aqueous fluid generator and firing said hot aqueous fluid generator with a sulfur-containing fuel, said hot aqueous fluid generator emitting a flue gas containing sulfur oxides;

(b) injecting said hot aqueous fluid via said well means into said petroleum-bearing formation;

(c) producing petroleum via said well means from said petroleum-bearing formation;

(d) flowing said flue gas containing sulfur oxides through a venturi scrubber vessel and thereafter through an emission scrubber vessel;

(e) flowing an aqueous sodium hydroxide solution having a pH of at least 7 into said emission scrubber vessel and therethrough with said flue gas to remove sulfur oxides therefrom and form sulfites;

(f) discharging from said emission scrubber vessel an aqueous sodium hydroxide solution having a pH greater than 6 and flowing said discharged aqueous sodium hydroxide solution into said venturi scrubber vessel above a venturi therein and therethrough with said flue gas to remove sulfur oxides therefrom and form sulfites;

(g) injecting ascorbic acid into said aqueous sodium hydroxide solution in an amount sufficient to inhibit the oxidation of said sulfites to sulfates;

(h) discharging an aqueous sodium hydroxide solution having a pH within the range of about 5 to 6 from said venturi scrubber vessel below said venturi;

(i) recirculating a portion of said sodium hydroxide solution having a pH of about 5 to 6 through said emission scrubber vessel and mixing said solution with said discharged sodium hydroxide solution from said emission scrubber vessel to further treat said flue gas and remove sulfur oxides therefrom and form sulfites;

(j) continue the recirculation until said sulfites reach a desired concentration;

(k) recovering said sulfites from said venturi scrubber vessel;

(l) injecting said recovered sulfites into said feed water in an amount sufficient to scavenge oxygen from said feed water and thereby reduce the corrosiveness of said feed water; and (m) discharging said flue gas having sulfur oxides removed therefrom from said emission scrubber vessel.

9. The method of claim 8 wherein said aqueous sodium hydroxide solution discharged from said emission scrubber vessel has a pH within the range of about $6\frac{1}{2}$ to $7\frac{1}{2}$ and wherein said aqueous sodium hydroxide solution discharged from said venturi scrubber vessel has a pH within the range of about 5 to 6.

* * * * *